United States Patent
Keshavan et al.

(10) Patent No.: US 11,482,254 B2
(45) Date of Patent: Oct. 25, 2022

(54) DATA STORAGE DEVICE INDEPENDENTLY DRIVING OUTER AND INNER FINE ACTUATORS

(71) Applicant: Western Digital Technologies, Inc., San Jose, CA (US)

(72) Inventors: Manoj Keshavan, San Jose, CA (US); Yanning Liu, San Jose, CA (US); Hitoshi Shindo, San Jose, CA (US); Siddhesh V. Sakhalkar, Berkeley, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/396,359

(22) Filed: Aug. 6, 2021

(65) Prior Publication Data
US 2022/0262402 A1    Aug. 18, 2022

Related U.S. Application Data

(63) Continuation-in-part of application No. 17/175,976, filed on Feb. 15, 2021.

(51) Int. Cl.
*G11B 5/48* (2006.01)
*G11B 21/10* (2006.01)

(52) U.S. Cl.
CPC ................... *G11B 21/106* (2013.01)

(58) Field of Classification Search
None
See application file for complete search history.

(56) References Cited

U.S. PATENT DOCUMENTS

| | | | | |
|---|---|---|---|---|
| 3,305,239 A | * | 2/1967 | Hathaway | G11B 17/165 369/231 |
| 5,060,100 A | * | 10/1991 | Mihara | G11B 5/486 |
| 5,978,752 A | * | 11/1999 | Morris | G05B 21/02 360/78.07 |
| 6,121,742 A | * | 9/2000 | Misso | G11B 5/553 |
| 6,229,677 B1 | * | 5/2001 | Hudson | G11B 5/4813 |
| 6,437,937 B1 | * | 8/2002 | Guo | G11B 5/5552 360/78.12 |
| 6,493,176 B1 | * | 12/2002 | Deng | G11B 5/59666 |
| 6,504,669 B1 | * | 1/2003 | Janz | G11B 5/483 |
| 6,697,211 B2 | | 2/2004 | Koganezawa | |
| 6,778,343 B2 | * | 8/2004 | Nunnelley | G11B 27/36 |
| 6,972,924 B1 | | 12/2005 | Chen et al. | |
| 8,335,049 B1 | * | 12/2012 | Liu | G11B 19/048 360/78.05 |
| 8,947,831 B1 | | 2/2015 | Ee et al. | |
| 9,437,230 B2 | | 9/2016 | Hatch | |
| 10,424,328 B1 | * | 9/2019 | Gaertner | G11B 5/4886 |
| 10,964,345 B1 | | 3/2021 | Haapala et al. | |
| 2002/0135924 A1 | * | 9/2002 | Fayeulle | G11B 5/54 |

(Continued)

*Primary Examiner* — Peter Vincent Agustin
(74) *Attorney, Agent, or Firm* — Patterson & Sheridan, LLP; Steven H. VerSteeg

(57) ABSTRACT

Control circuitry is disclosed configured to control inner fine actuators of a first plurality of inner actuator arms and independently control a first outer fine actuator of a first outer actuator arm. Inner fine actuators of a second plurality of inner actuator arms are controlled while independently controlling a second outer fine actuator of a second outer actuator arm. Each actuator arm comprises at least one head configured to access a disk surface of a disk.

20 Claims, 5 Drawing Sheets

(56) References Cited

U.S. PATENT DOCUMENTS

| | | | | |
|---|---|---|---|---|
| 2004/0016102 A1* | 1/2004 | Prater | ................ | G11B 5/5521 |
| | | | | 29/603.03 |
| 2006/0280078 A1* | 12/2006 | Hanks | ................ | G11B 7/0037 |
| | | | | 369/47.39 |
| 2019/0279675 A1* | 9/2019 | Schmidt | ............... | G11B 5/5965 |
| 2020/0020357 A1* | 1/2020 | Dunn | ................ | G11B 5/5569 |

* cited by examiner

US 11,482,254 B2

DATA STORAGE DEVICE INDEPENDENTLY DRIVING OUTER AND INNER FINE ACTUATORS

CROSS REFERENCE TO RELATED APPLICATIONS

This application is a continuation in part of U.S. patent application Ser. No. 17/175,976 filed on Feb. 15, 2021, which is hereby incorporated by reference in its entirety.

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

DETAILED DESCRIPTION

Figure 2A:
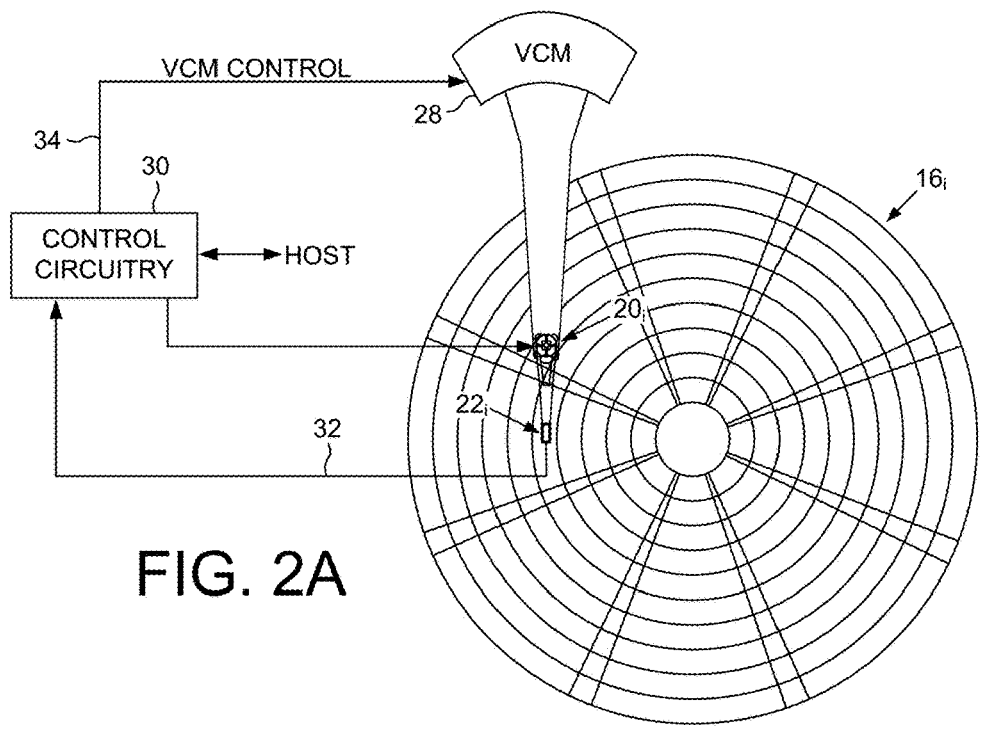
FIG. 2A shows a data storage device in the form of a disk drive according to an embodiment comprising a plurality of disks each comprising a top disk surface and a bottom disk surface.
Figure 2B:
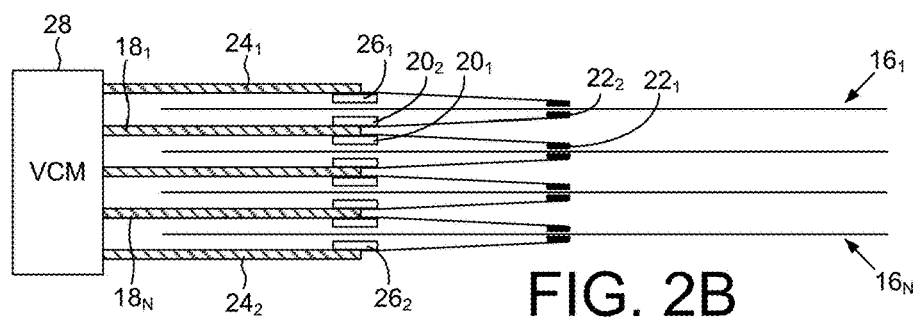
FIG. 2B shows an embodiment wherein a plurality of inner actuator arms each comprise a first inner fine actuator configured to actuate a top head over one of the top disk surfaces and a second inner fine actuator configured to actuate a bottom head over one of the bottom disk surfaces, and top and bottom outer actuator arms each comprising an outer fine actuator configured to actuate a top head over a top disk surface of the outer top disk, and a bottom head over a bottom disk surface of the outer bottom disk.

FIGS. 2A and 2B show a data storage device in the form of a disk drive according to an embodiment comprising a plurality of disks $16_1$-$16_N$ each comprising a top disk surface and a bottom disk surface. A plurality of inner actuator arms $18_1$-$18_N$ each comprising a first inner fine actuator (e.g., $20_1$) configured to actuate a top head (e.g., $22_1$) over one of the top disk surfaces and a second inner fine actuator (e.g., $20_2$) configured to actuate a bottom head (e.g., $22_2$) over one of the bottom disk surfaces. A first outer actuator arm $24_1$ comprises a first outer fine actuator $26_1$ configure to actuate a top head over a top disk surface of a top disk, and a second outer actuator arm $24_2$ comprises a second outer fine actuator $26_2$ configured to actuate a bottom head over a bottom disk surface of a bottom disk. A coarse actuator (e.g., VCM 28) is configured to concurrently move the actuator arms to actuate the heads over their respective disk surface, wherein the inner fine actuators are controlled independent from the outer fine actuators.

Figure 1:
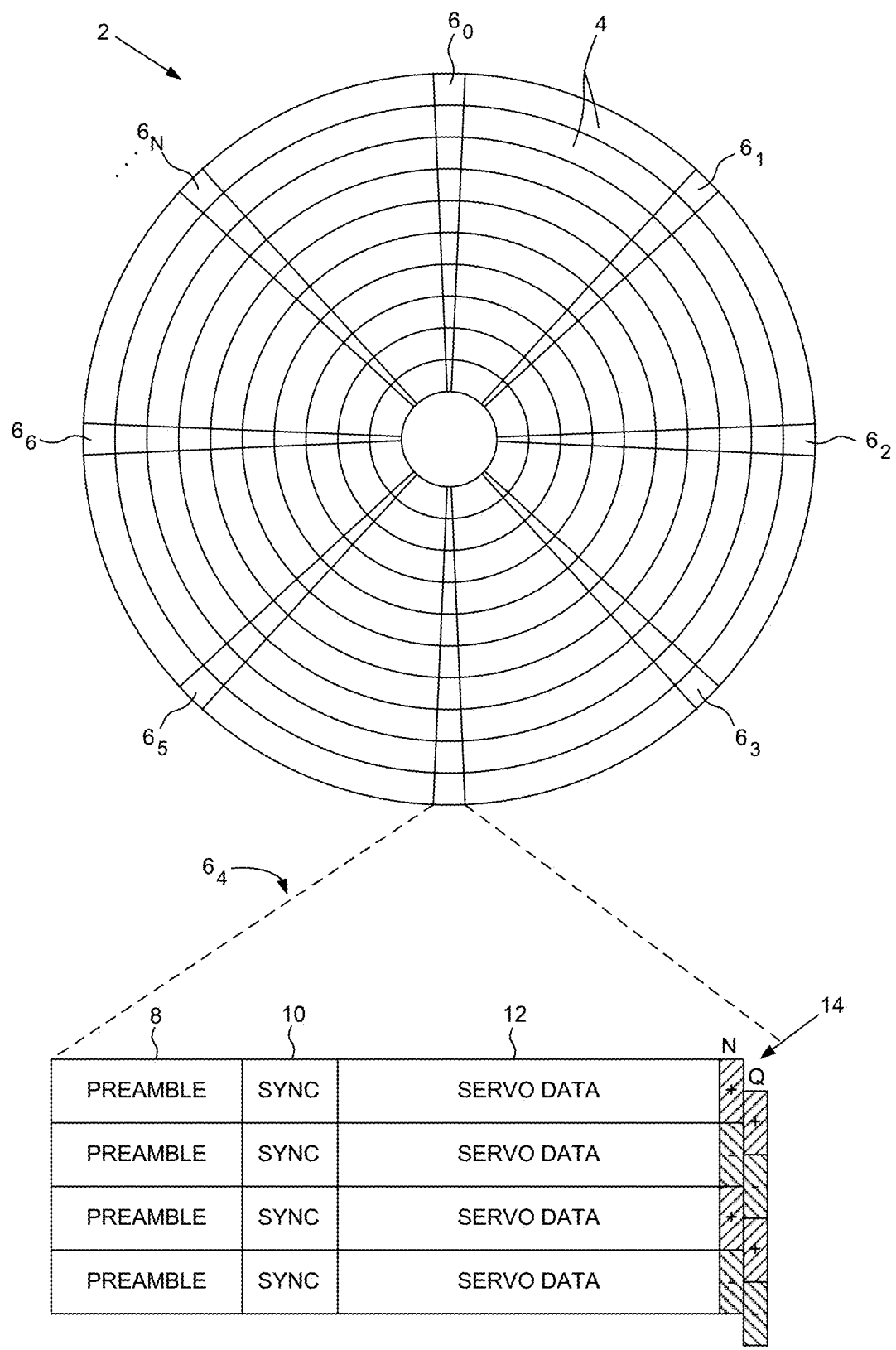
FIG. 1 shows a prior art disk format comprising a plurality of servo tracks defined by servo sectors.

In the embodiment of FIG. 2A, the disk drive comprises control circuitry 30 configured to process read signals 32 emanating from the heads to demodulate servo sectors and generate a position error signal (PES) representing an error between the actual position of a head and a target position relative to a target data track. A servo control system in the control circuitry 30 filters the PES using a suitable compensation filter to generate a control signal 34 applied to the VCM 28 which rotates the actuator arms about a pivot in order to actuate the head radially over the disk in a direction that reduces the PES. The heads are also servoed using a fine actuator, such as a piezoelectric (PZT) actuator, configured to actuate a suspension relative to the actuator arm as shown in FIG. 2B, and/or configured to actuate the head relative to the suspension. The servo sectors may comprise any suitable head position information, such as a track address for coarse positioning and servo bursts for fine positioning. In one embodiment, the servo bursts may comprise any suitable pattern wherein at least one servo burst consists of a periodic sequence of magnetic transitions, such as an amplitude based servo pattern or a phase based servo pattern (FIG. 1).

Figure 2C:
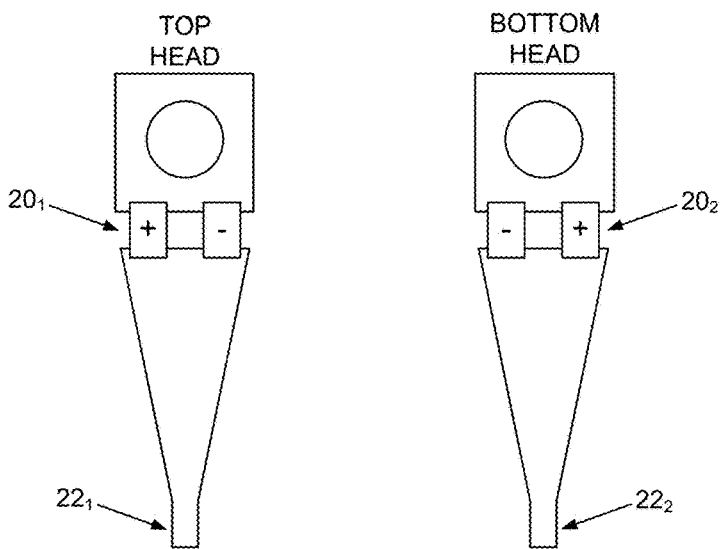
FIG. 2C shows an embodiment wherein the fine actuator for a top head is mechanically equivalent to the fine actuator for a bottom head resulting in opposite radial movements in response to a common control signal due to their flipped orientation relative to the top and bottom disk surfaces.

FIG. 2C shows an embodiment of a fine actuator comprising PZT elements configured to actuate a suspension relative to an actuator arm. In this embodiment, the fine actuator for a top head (e.g., inner fine actuator $20_1$) is mechanically equivalent to the fine actuator for a bottom head (e.g., inner fine actuator $20_2$). In this embodiment, a bottom fine actuator and suspension is "flipped over" relative to a top fine actuator and suspension as shown in FIG. 2C such that when a control signal is concurrently applied to both the top/bottom fine actuators of an inner actuator arm it causes an opposite radial movement of the top/bottom fine actuators. In one embodiment, concurrently actuating the top/bottom fine actuators of the inner actuator arms in opposite radial directions attenuates a vibration mode of the actuator arms.

Figure 3:
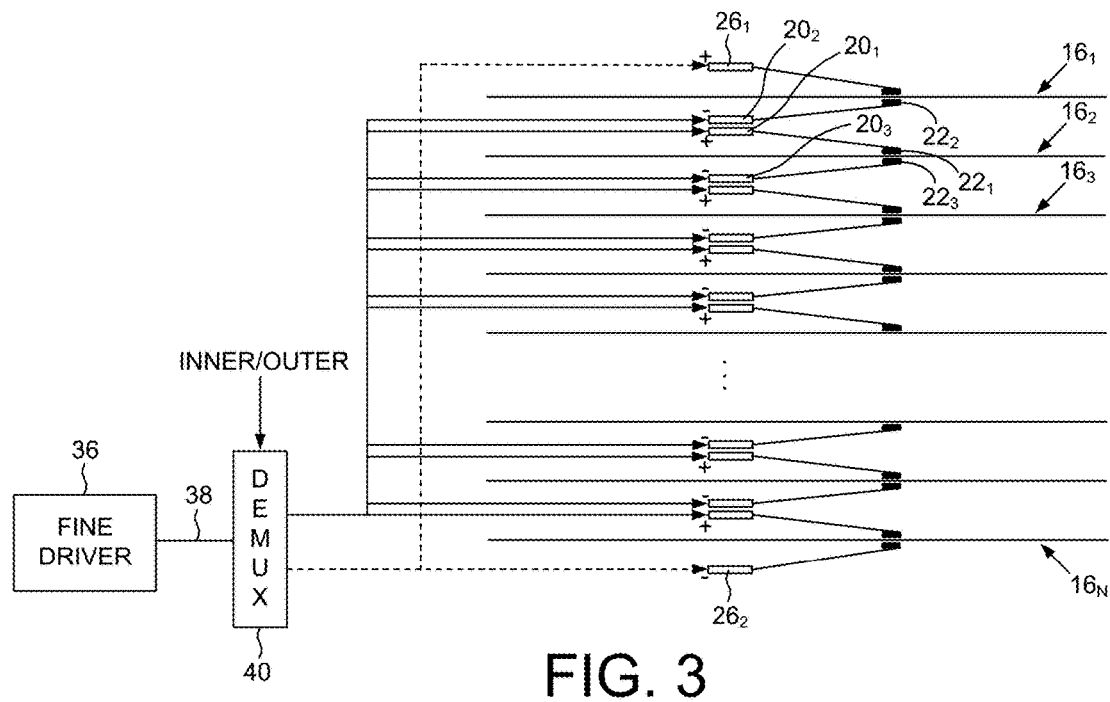
FIG. 3 shows an embodiment wherein a fine driver generates a control signal that is concurrently applied to the fine actuators of either the inner actuator arms or the outer actuator arms.

FIG. 3 shows control circuitry according to an embodiment wherein all of the fine actuators are mechanically equivalent, and the fine actuators of the bottom heads are flipped over relative to the fine actuators of the top head such as shown in FIG. 2C. A fine driver 36 generates a control signal 38 that is selectively applied (via a demultiplexer 40) to the inner fine actuators (e.g., $20_1$ and $20_2$) of the inner actuator arms or to the outer fine actuators ($26_1$ and $26_2$) of the outer actuator arms. Accordingly in this embodiment, the demultiplexer 40 may be configured so that the control signal 38 concurrently drives all of the inner fine actuators, including to drive the top/bottom fine actuators in opposite radial directions so as to attenuate a vibration mode of the actuator arms. Alternatively the demultiplexer may be configured so that the control signal 38 concurrently drives the outer fine actuators (in this embodiment the top fine actuator $26_1$ being driven in the opposite radial direction as the bottom fine actuator $26_2$). In this embodiment, concurrently driving the inner fine actuators without driving the outer fine actuators may attenuate a disturbance that may otherwise affect the inner actuator arms. Similarly, concurrently driving the outer fine actuators without driving the inner fine actuators may attenuate a disturbance that may otherwise affect the outer actuator arms.

Figure 4:
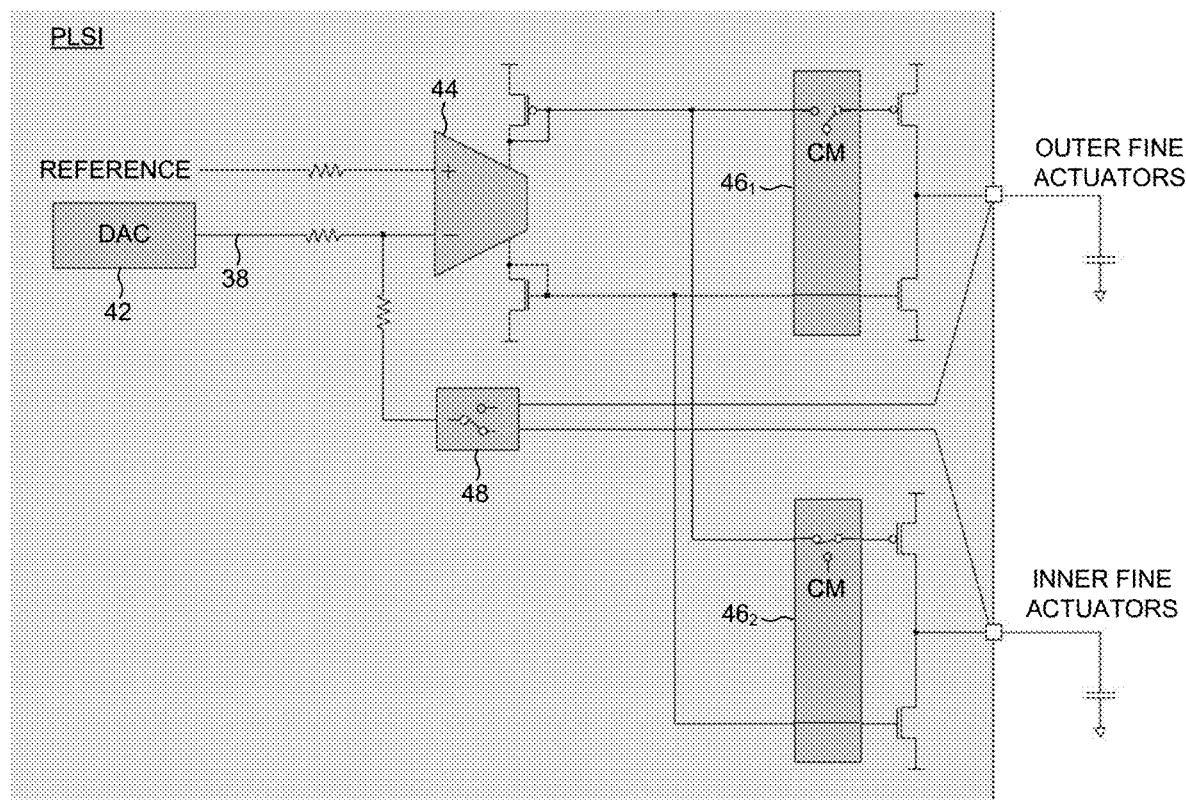
FIG. 4 shows control circuitry according to an embodiment for applying the control signal to the fine actuators of either the inner actuator arms or the outer actuator arms.

FIG. 4 shows control circuitry according to an embodiment for applying the control signal 38 of FIG. 3 to the fine actuators of either the inner actuator arms or the outer actuator arms. The control circuitry comprises an input stage including a digital-to-analog converter 42 for converting a digital control signal into an analog control signal 38, and a differential amplifier 44 for amplifying the analog control signal 38. Switches $46_1$ and $46_2$ are configured to select either the outer fine actuators or the inner fine actuators to be driven by the input stage. Switch 48 is configured to apply feedback to the differential amplifier 44 from either the outer fine actuator or the inner fine actuator driving stages (depending on which is active). When either the inner fine actuators or the outer fine actuators are not selected (inactive), the respective switch $46_1$ and $46_2$ is configured so that the corresponding output stage is biased to the output common mode. In the example of FIG. 4, the switches are configured such that the inner fine actuators are active (driven by the control signal 38) and the outer fine actuators are inactive (output stage biased to the output common mode).

Figure 5A:
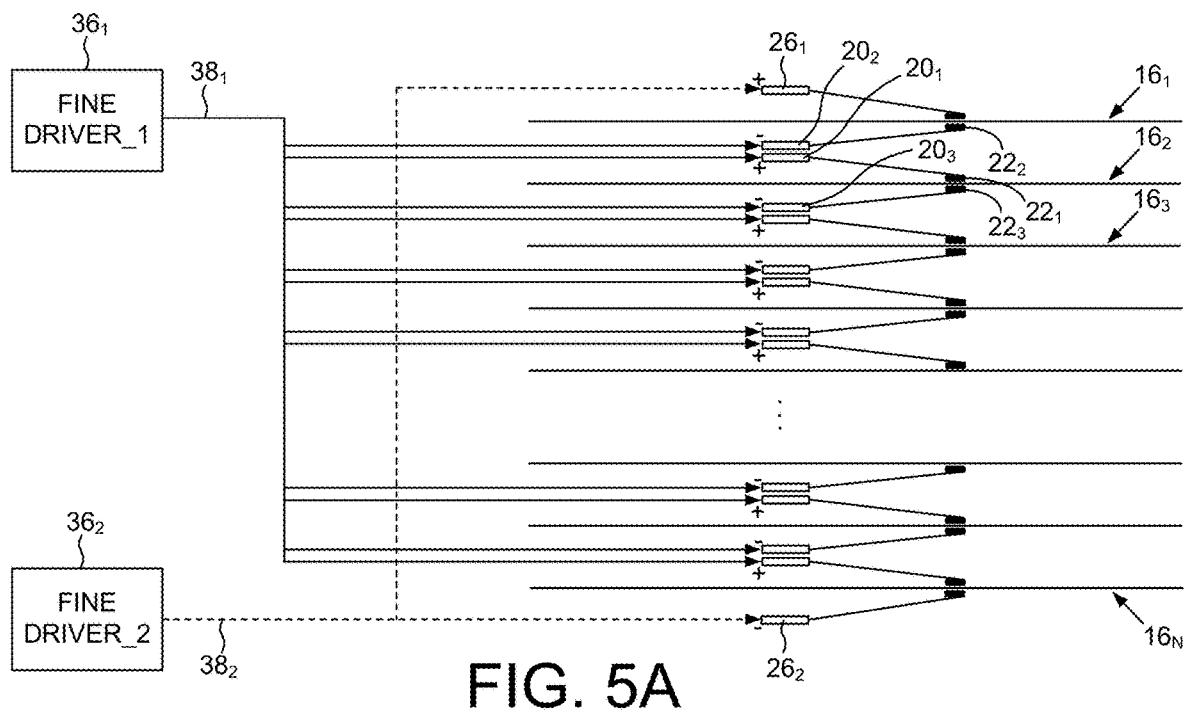
FIG. 5A shows an embodiment wherein a first fine drive controls the fine actuators of the inner actuator arms and a second fine drive concurrently controls the fine actuators of the outer actuator arms.

FIG. 5A shows control circuitry according to an embodiment wherein a first fine driver $36_1$ generates a first control signal $38_1$ for controlling the inner fine actuators (e.g., $20_1$ and $20_2$) and a second fine driver $36_2$ generates a second controls signal $38_2$ for independently controlling the outer fine actuators $26_1$ and $26_2$. In one embodiment, the inner and outer fine actuators may be controlled concurrently in order to concurrently access two disk surfaces. For example, the top head may access the top disk surface of the top disk while one of the middle heads concurrently accesses one of the middle disk surfaces (top or bottom) of a middle disk. In the embodiment of FIG. 5A, the fine actuators are mechanically equivalent with the bottom fine actuators being "flipped over" relative to the top fine actuators such as shown in FIG. 2C wherein a common control signal $38_1$ drives all of the inner fine actuators and a common control signal $38_2$ drives both of the outer fine actuators.

Figure 5B:
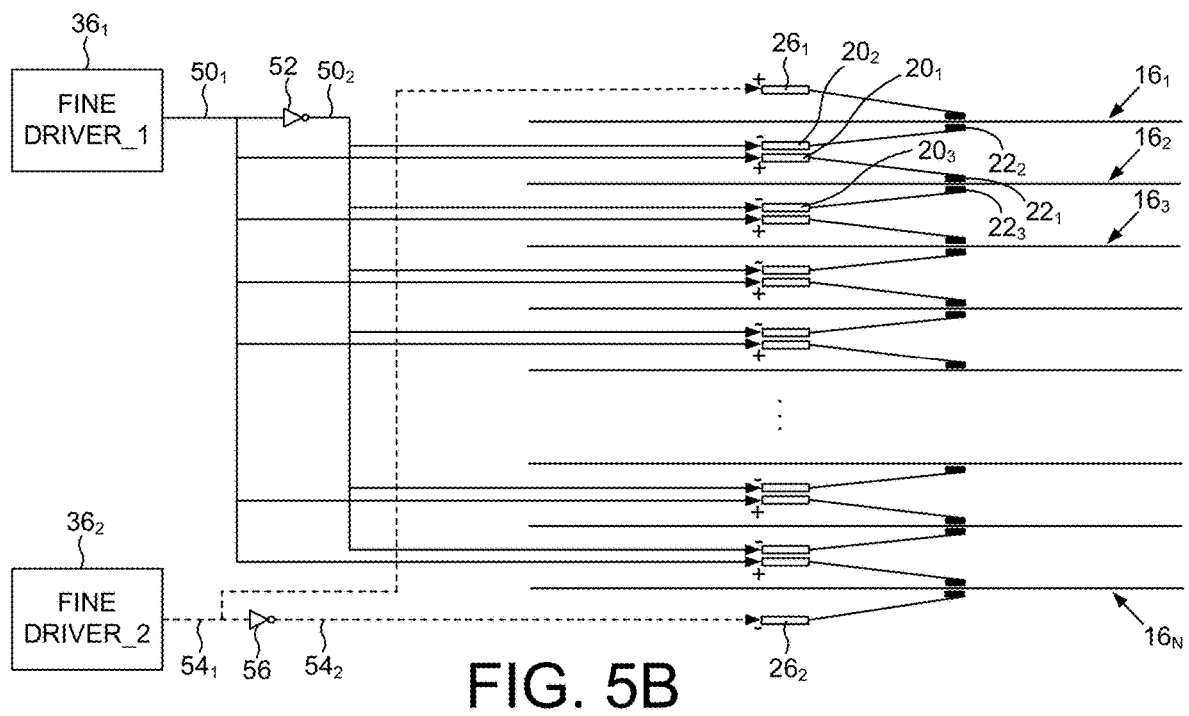
FIG. 5B shows an embodiment wherein the control signal generated by a fine actuator may be inverted in order to concurrently actuate the fine actuators of top and bottom disk surfaces.

In an alternative embodiment shown in FIG. 5B, the top and bottom fine actuators are configured to actuate in the same radial direction in response to a common control signal. Accordingly in this embodiment, the first fine actuator 361 generates a first control signal 501 for controlling the top inner fine actuators of the middle disks, and a second control signal 502 having an opposite polarity (via inverter 52) for controlling the bottom inner fine actuators of the middle disks. Similarly, the second fine actuator generates a first control signal 541 for controlling the top outer fine actuator of the top disk, and a second control signal 542 having an opposite polarity (via inverter 56) for controlling the bottom outer fine actuator of the bottom disk. In this embodiment, the negative polarity control signals 502 and 542 are shown as being generated by inverting the corresponding positive polarity control signals 501 and 541. However, the analog inverter shown in FIG. 5B merely indicates that in one embodiment the control signals generated by each fine driver have appositive polarity. In other embodiments, the positive/negative polarity control signals may be generated in any other suitable manner, such as by using a noninverting amplifier and an inverting amplifier with equal gains. In addition, a similar technique of inverting the control signal for top/bottom fine actuators may be implemented in other embodiments described above, such as in the embodiment of FIG. 3, if the fine actuators are configured to actuate in the same radial direction in response to a common control signal.

Figure 6A:
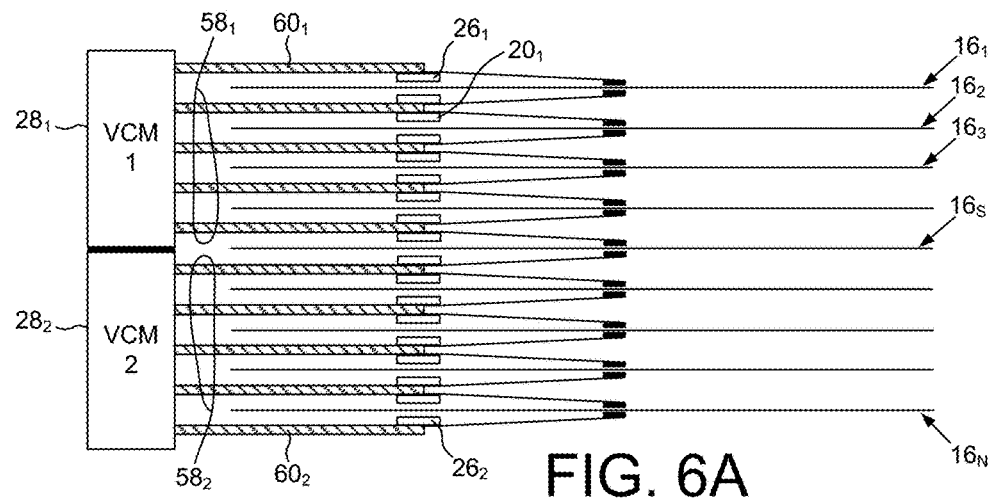
FIG. 6A shows an embodiment wherein the disk drive comprises multiple actuator assemblies configured into what is referred to as a split actuator.
Figure 6B:
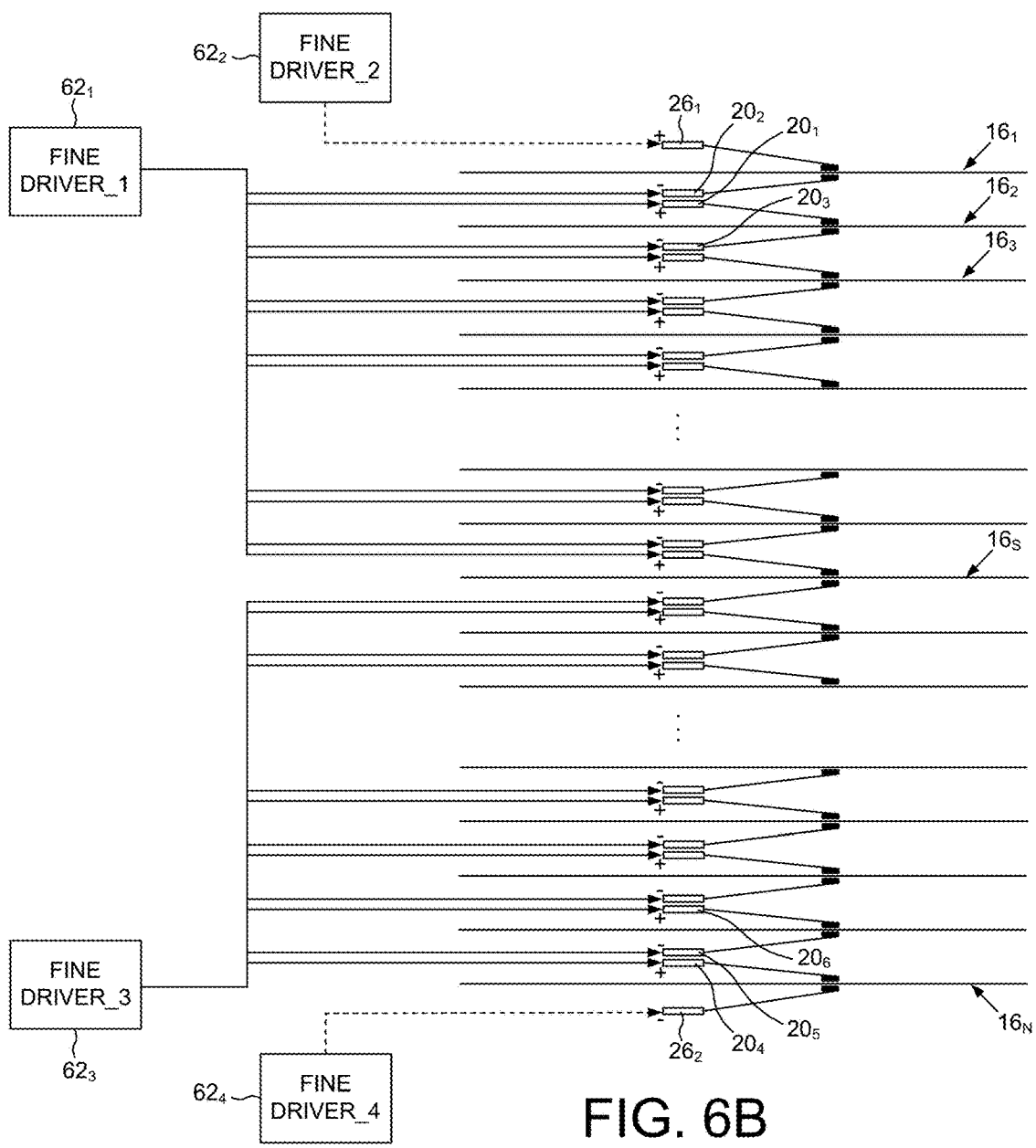
FIG. 6B shows an embodiment wherein inner fine actuators of multiple actuator assemblies are driven independent from first and second outer fine actuators.

FIGS. 6A and 6B show an embodiment wherein the data storage device comprises at least two coarse actuators (e.g., VCM 1 and VCM 2) assembled into a configuration referred to as a split actuator wherein two or more of the coarse actuators actuate respective subsets of actuator arms about a common pivot. In this embodiment, a first plurality of inner actuator arms $58_1$ each comprise a first inner fine actuator (e.g., inner fine actuator $20_1$) configured to actuate a top head over one of the top disk surfaces and a second inner fine actuator (e.g., inner fine actuator $20_2$) configured to actuate a bottom head over one of the bottom disk surfaces. A first outer actuator arm $60_1$ comprises a first outer fine actuator $26_1$ configure to actuate a top head over a top disk surface of a top disk. A first coarse actuator $28_1$ (e.g., VCM 1) is configured to concurrently move the first plurality of inner actuator arms $58_1$ and the first outer actuator arm $60_1$ to actuate the respective heads over their respective disk surface. A second plurality of inner actuator arms $58_2$ each comprise a first inner fine actuator (e.g., inner fine actuator $20_4$) configured to actuate a top head over one of the top disk surfaces and a second inner fine actuator (e.g., inner fine actuator $20_5$) configured to actuate a bottom head over one of the bottom disk surfaces. A second outer actuator arm $60_2$ comprises a second outer fine actuator $26_2$ configured to actuate a bottom head over a bottom disk surface of a bottom disk. A second coarse actuator $28_2$ (e.g., VCM 2) is configured to concurrently move the second plurality of inner actuator arms $58_2$ and the second outer actuator arm $60_2$ to actuate the respective heads over their respective disk surface. The control circuitry 30 is configured to control the inner fine actuators (e.g., inner fine actuators $20_1$-$20_6$) independent from the outer fine actuators $26_1$ and $26_2$. In one embodiment, the control circuitry is further configured to drive the first outer fine actuator $26_1$ independent from the second outer fine actuator $26_2$ which enables a concurrent access (write or read) of the top disk surface $16_1$ and the bottom disk surface $16_N$.

In the embodiment of FIG. 6A, the middle disk $16_S$ is a shared disk since the top disk surface is accessed using the bottom inner actuator arm of the first plurality of inner actuator arms $58_1$ and the bottom disk surface is accessed using the top inner actuator arm of the second plurality of inner actuator arms $58_2$. In this manner, each inner actuator arm comprises top and bottom inner fine actuators which are driven in opposite radial directions in order to attenuate a vibration mode of the actuator arms as described above. In this embodiment, concurrently driving the inner fine actuators (of the first plurality $58_1$ and/or second plurality $58_2$ of inner actuator arms) without driving the outer fine actuators $26_1$ and $26_2$ may attenuate a disturbance that may otherwise adversely affect the inner actuator arms. Similarly, driving the outer fine actuators $26_1$ and/or $26_2$ without driving the inner fine actuators may attenuate a disturbance that may otherwise adversely affect the outer actuator arms. In addition, in this embodiment, driving the inner fine actuators (e.g., inner fine actuators of the first plurality $58_1$ and/or second plurality $58_2$ of inner actuator arms) independent from the outer fine actuators $26_1$ and $26_2$ may attenuate a coupling disturbance (e.g., that could excite a coupled vibration mode) between the top and bottom actuator assemblies.

In the embodiment of FIG. 6B, the control circuitry comprises a first fine driver $62_1$ configured to control the inner fine actuators (e.g., inner fine actuators $20_1$-$20_3$) of the first plurality of inner actuator arms $58_1$, and a second fine driver 622 configured to control the first outer fine actuator $26_1$. The control circuitry further comprises a third fine driver 623 configured to control the inner fine actuators (e.g., inner fine actuators $20_4$-$20_6$) of the second plurality of inner actuator arms $58_2$, and a fourth fine driver 624 configured to control the second outer fine actuator $26_2$. In this manner, the inner fine actuators are driven independent from the outer fine actuators (to attenuate, for example, a vibration mode and/or a coupling disturbance) while enabling the concurrent access of two disk surfaces (a first disk surface accessed using the top actuator assembly and a second disk surface accessed using the bottom actuator assembly).

In one embodiment, the split actuator may comprise more than two actuator assemblies, for example, three actuator assemblies and two shared disks. In this embodiment, each subset of inner fine actuators may be driven using a respective fine driver (i.e. three fine drivers for driving three actuator assemblies).

In one embodiment, the first (top) outer fine actuator $26_1$ in FIG. 6B may be mechanically equivalent to the second (bottom) outer fine actuator $26_2$, wherein the second (bottom) outer fine actuator $26_2$ and suspension is "flipped over" relative to the first (top) outer fine actuator $26_1$ and suspension such as shown in FIG. 2C so that when a control signal is concurrently applied to both the first and second outer fine actuators it causes an opposite radial movement of the first and second fine actuators (as indicated by the "+" and "−" labels in FIG. 6B). In another embodiment, driving the top/bottom inner fine actuators in opposite radial directions as well as driving the first and second outer fine actuators in opposite radial directions may be achieved by inverting the driving signal such as shown in FIG. 5B.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one embodiment, the read channel and data storage controller are implemented as separate integrated circuits, and in an alternative embodiment they are fabricated into a single integrated circuit or system on a chip (SOC). In addition, the control circuitry may include a suitable power circuit(s) and/or a suitable preamp circuit(s) implemented as separate integrated circuits, integrated into the read channel or data storage controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In yet another embodiment, the control circuitry comprises suitable logic circuitry, such as state machine circuitry. In some embodiments, at least some of the flow diagram blocks may be implemented using analog circuitry (e.g., analog comparators, timers, etc.), and in other embodiments at least some of the blocks may be implemented using digital circuitry or a combination of analog/digital circuitry.

In addition, any suitable electronic device, such as computing devices, data server devices, media content storage devices, etc. may comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
   a plurality of disks each comprising a top disk surface and a bottom disk surface;
   a first plurality of inner actuator arms each comprising a first inner fine actuator configured to actuate a top head over one of the top disk surfaces and a second inner fine actuator configured to actuate a bottom head over one of the bottom disk surfaces;
   a first outer actuator arm comprising a first outer fine actuator configured to actuate a top head over a top disk surface of a top disk;
   a first coarse actuator configured to concurrently move the first plurality of inner actuator arms and the first outer actuator arm to actuate the respective heads over respective disk surfaces;
   a second plurality of inner actuator arms each comprising a first inner fine actuator configured to actuate a top head over one of the top disk surfaces and a second inner fine actuator configured to actuate a bottom head over one of the bottom disk surfaces;
   a second outer actuator arm comprising a second outer fine actuator configured to actuate a bottom head over a bottom disk surface of a bottom disk;
   a second coarse actuator configured to concurrently move the second plurality of inner actuator arms and the second outer actuator arm to actuate the respective heads over respective disk surfaces; and
   control circuitry configured to control the inner fine actuators independent from the outer fine actuators.

2. The data storage device as recited in claim 1, wherein the control circuitry is further configured to control the first outer fine actuator independent from the second outer fine actuator.

3. The data storage device as recited in claim 1, wherein the control circuitry is further configured to control the first inner fine actuator of a first inner actuator arm to actuate the top head of the first inner actuator arm in a first radial direction and concurrently control the second inner fine actuator of the first inner actuator arm to actuate the bottom head of the first inner actuator arm in a second radial direction opposite the first radial direction.

4. The data storage device as recited in claim 3, wherein:
   the first inner fine actuator of the first inner actuator arm has a first electrical orientation and the second inner fine actuator of the first inner actuator arm has a second electrical orientation that is flipped relative to the first electrical orientation; and
   the top head of the first inner actuator arm and the bottom head of the first inner actuator arm are actuated by concurrently applying a control signal to the first inner fine actuator and the second inner fine actuator of the first inner actuator arm.

5. The data storage device as recited in claim 3, wherein the top head of the first inner actuator arm and the bottom head of the first inner actuator arm are actuated by:
   applying a first control signal to the first inner fine actuator of the first inner actuator arm; and
   applying a second control signal to the second inner fine actuator of the first inner actuator arm, the second control signal having an opposite polarity of the first control signal.

6. The data storage device as recited in claim 1, wherein the control circuitry is further configured to control the first outer fine actuator independent from the second outer fine actuator.

7. The data storage device as recited in claim 1, wherein the control circuitry is further configured to control the inner fine actuators of the first plurality of inner actuator arms independent from the inner fine actuators of the second plurality of inner actuator arms.

8. The data storage device as recited in claim 1, wherein the control circuitry comprises:
   a first fine driver configured to control the inner fine actuators of the first plurality of inner actuator arms;
   a second fine driver configured to control the first outer fine actuator;
   a third fine driver configured to control the inner fine actuators of the second plurality of inner actuator arms; and
   a fourth fine driver configured to control the second outer fine actuator.

9. The data storage device as recited in claim 8, further comprising:
   a third plurality of inner actuator arms each comprising a first inner fine actuator configured to actuate a top head over one of the top disk surfaces and a second inner fine actuator configured to actuate a bottom head over one of the bottom disk surfaces, wherein the control circuitry further comprises:
   a fifth fine driver configured to control the inner fine actuators of the third plurality of inner actuator arms.

10. The data storage device as recited in claim 1, wherein the control circuitry is configured to concurrently access the top disk surface of a top disk and a disk surface corresponding to one of the second plurality of inner actuator arms.

11. The data storage device as recited in claim 1, wherein the control circuitry is configured to concurrently access the top disk surface of a top disk and the bottom disk surface of a bottom disk.

12. The data storage device as recited in claim 1, wherein the control circuitry is further configured to control the first outer fine actuator of the first outer actuator arm to actuate the top head of the first outer actuator arm in a first radial direction and concurrently control the second outer fine actuator of the second outer actuator arm to actuate the bottom head of the second outer actuator arm in a second radial direction opposite the first radial direction.

13. The data storage device as recited in claim 12, wherein:
   the first outer fine actuator of the first outer actuator arm has a first electrical orientation and the second outer fine actuator of the second outer actuator arm has a second electrical orientation that is flipped relative to the first electrical orientation; and
   the top head of the first outer actuator arm and the bottom head of the second outer actuator arm are actuated by concurrently applying a control signal to the first outer fine actuator and the second outer fine actuator.

14. The data storage device as recited in claim 12, wherein the top head of the first outer actuator arm and the bottom head of the second outer actuator arm are actuated by:
   applying a first control signal to the first outer fine actuator; and
   applying a second control signal to the second outer fine actuator, the second control signal having an opposite polarity of the first control signal.

15. Control circuitry comprising instructions that, when executed, are configured to:
   control inner fine actuators of a first plurality of inner actuator arms and independently control a first outer fine actuator of a first outer actuator arm;

concurrently move the first plurality of inner actuator arms and the first outer actuator arm;

control inner fine actuators of a second plurality of inner actuator arms and independently control a second outer fine actuator of a second outer actuator arm; and concurrently move the second plurality of inner actuator arms and the second outer actuator arm, wherein each actuator arm comprises at least one head configured to access a disk surface of a disk.

16. The control circuitry as recited in claim 15, wherein the control circuitry comprises:
   a first fine driver configured to control the inner fine actuators of the first plurality of inner actuator arms;
   a second fine driver configured to control the first outer fine actuator;
   a third fine driver configured to control the inner fine actuators of the second plurality of inner actuator arms; and
   a fourth fine driver configured to control the second outer fine actuator.

17. The control circuitry as recited in claim 15, wherein the instructions, when executed, are configured to:
   drive the inner fine actuators of the first plurality of inner actuator arms without driving the first outer fine actuator.

18. The control circuitry as recited in claim 15, wherein the instructions, when executed, are configured to:
   drive the first outer fine actuator without driving the inner fine actuators of the first plurality of inner actuator arms.

19. The control circuitry as recited in claim 15, further comprising:
   a first switch switchable between a first active mode and a first inactive mode, wherein in the first active mode the first switch is configured to apply a control signal to the inner fine actuators of the first plurality of inner actuator arms; and
   a second switch switchable between a second active mode and a second inactive mode, wherein in the second active mode the second switch is configured to apply the control signal to the first outer fine actuator of the first outer actuator arm.

20. Control circuitry comprising:
   a means for controlling inner fine actuators of a first plurality of inner actuator arms and independently controlling a first outer fine actuator of a first outer actuator arm;
   a means for concurrently moving the first plurality of inner actuator arms and the first outer actuator arm;
   a means for controlling inner fine actuators of a second plurality of inner actuator arms and independently controlling a second outer fine actuator of a second outer actuator arm; and
   a means for concurrently moving the second plurality of inner actuator arms and the second outer actuator arm,
   wherein each actuator arm comprises at least one head configured to access a disk surface of a disk.

* * * * *